United States Patent [19]

Hunger

[11] Patent Number: 4,928,488

[45] Date of Patent: May 29, 1990

[54] HYDRAULICALLY-OPERATED SUPPORT DEVICE FOR SEMITRAILERS

[76] Inventor: Walter Hunger, Otto-Nagler-Strasse 13, 87 Wuerzburg, Fed. Rep. of Germany

[21] Appl. No.: 309,133

[22] Filed: Feb. 13, 1989

[51] Int. Cl.⁵ .......................................... F16D 31/02
[52] U.S. Cl. .................................... 60/480; 60/484; 60/486; 91/167 R; 91/216 R; 91/525; 91/535; 254/93 VA; 280/475; 280/766.1
[58] Field of Search ............... 60/477, 480, 484, 486; 91/167 R, 216 R, 216 A, 216 B, 217, 520, 525, 535; 92/62; 280/475, 763.1, 765.1, 766.1; 254/93 VA, 93 R

[56] References Cited

U.S. PATENT DOCUMENTS

| | | | |
|---|---|---|---|
| 1,130,884 | 3/1915 | Blakey et al. | 254/93 VA |
| 2,453,350 | 11/1948 | Stegeman | 60/480 X |
| 3,610,100 | 10/1971 | Hoffman | 91/167 R |
| 3,672,159 | 6/1972 | Sundin | 60/480 X |
| 3,945,300 | 3/1976 | Bourges | 91/535 X |
| 4,210,061 | 7/1980 | Bianchetta | 60/484 |

Primary Examiner—Edward K. Look

Attorney, Agent, or Firm—Foley & Lardner, Schwartz, Jeffery, Schwaab, Mack, Blumenthal & Evans

[57] ABSTRACT

A hydraulically-operated support device for semitrailers is disclosed comprising a hydraulic cylinder semitrailer support and a pump subassembly having three independently operable pumps for generating and controlling the hydraulic operating pressure. The hydraulic cylinder semitrailer support has an extending piston in an extending cylinder, in the bottom end of which is formed a load-raising cylinder for a load raising-piston. A first annular space is formed between the extending piston and the extending cylinder and a second annular space is formed between the load-raising piston and the load-raising cylinder. The annular spaces allow application of pressure in the retraction direction. The pump subassembly comprises an extending pump acting on the extending piston, a load-raising pump acting on the load-raising piston and a retracting pump acting on the annular spaces. The transmission ratio between the load-raising pump and the load-raising piston is substantially lower than the transmission ratio between the extending pump and the extending piston.

11 Claims, 1 Drawing Sheet

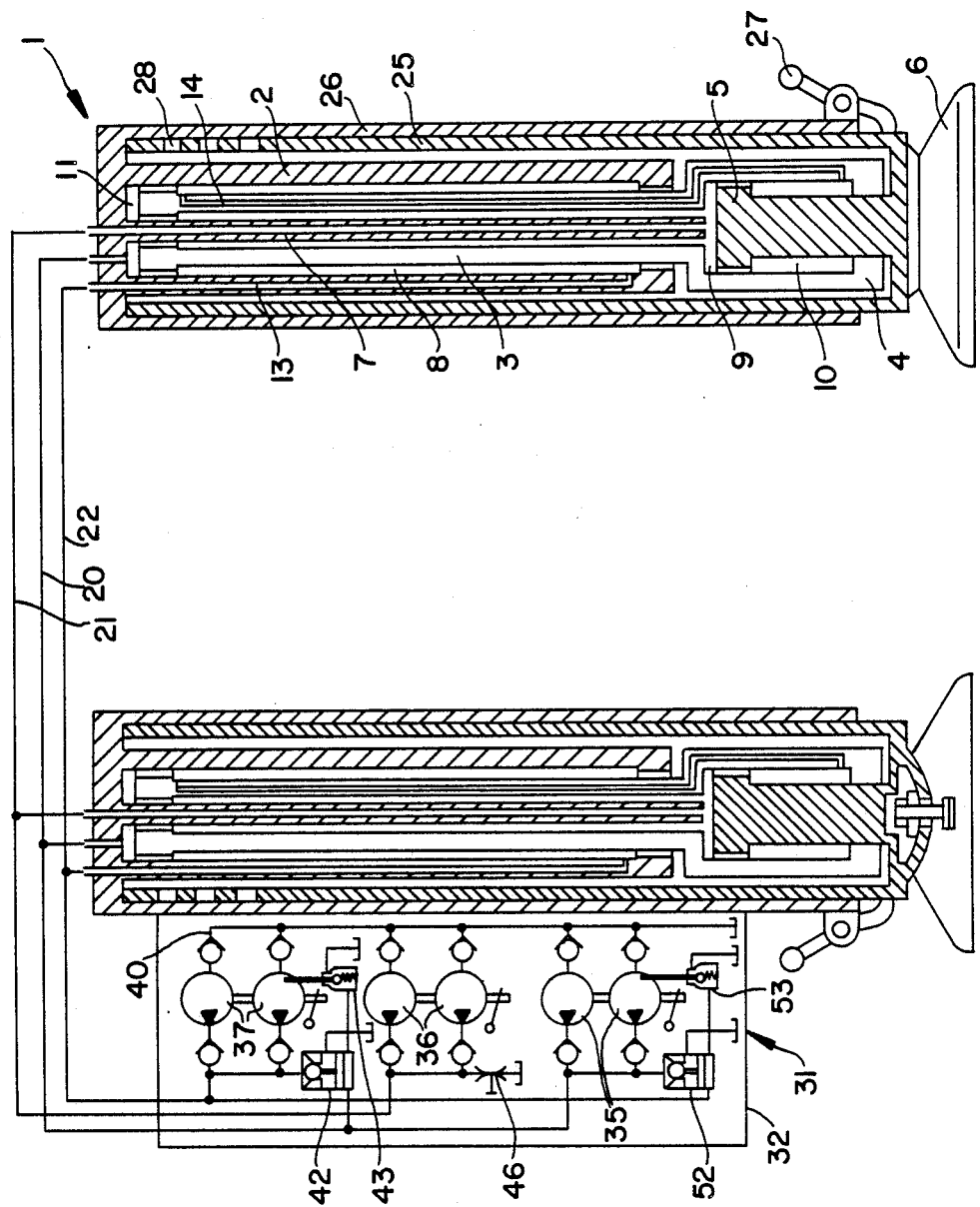

4,928,488

HYDRAULICALLY-OPERATED SUPPORT DEVICE FOR SEMITRAILERS

BACKGROUND OF THE INVENTION

The present invention relates to support devices for semitrailers, and more particularly to a hydraulically-operated support device wherein the operations of extension, load raising and retraction are each carried out by separate units.

Support devices are used to lift semitrailers when they are uncoupled from or coupled to their tractor. Various constructions of support devices of this kind are known. When such devices are hydraulically operated, they are generally simple hydraulic cylinder arrangements pressurized by separately attached pump units which may have a variable transmission ratio, thus entailing complicated constructions and heavy stresses.

SUMMARY OF THE INVENTION

It is an object of the present invention to provide a hydraulically-operated support device for semitrailers that can be operated with lower stress by separate subassemblies for lowering and load raising.

It is a further object of the invention to provide a support device which is simpler to manufacture.

It is yet another object of the invention to provide a support device that is of compact construction; wherein the extending cylinder and the load raising cylinder are integrated in one support foot, and the pump assembly with all the pump units is fastenable to one of the supports so as to permit the shortest connection paths.

These and other objects are achieved according to the invention by a hydraulically-operated support device for semitrailers, comprising at least one hydraulic cylinder semitrailer support and a pump subassembly. The hydraulic cylinder semitrailer support comprises an extending piston and an extending cylinder defining a first annular space therebetween and a load-raising piston and a load-raising cylinder defining a second annular space therebetween, the load-raising cylinder formed at a bottom end of the extending cylinder. The pump subassembly for generating and controlling the hydraulic operating pressure comprises three independently-operable pumps: an extending pump communicating with and acting on the extending piston, a load-raising pump communicating with and acting on the load-raising piston, and a retracting pump communicating with and acting on the first and second annular spaces. The transmission ratio between the load-raising pump and the load-raising piston is substantially lower than the transmission ratio between the extending pump and the extending piston.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 shows a support device for semitrailers according to the present invention, comprising two semitrailer supports, shown in longitudinal section, and a pump subassembly fastened to one support.

DETAILED DESCRIPTION OF THE PREFERRED EMBODIMENTS

Referring to FIG. 1, each semitrailer support 1 comprises extending cylinder 2, the top end of which is fastened to the semitrailer (not shown). Extending piston 3 is slidably received in each extending cylinder. At its bottom end extending piston 3 is widened to form load-raising cylinder 4, in which load-raising piston 5 is slidably received. The bottom end of load-raising piston 5 is supported on foot disk 6. Load-raising piston 5 permits tilting to a limited extent in any direction with the aid of a spherical footstep bearing (not shown).

Extending piston 5 is hollowed over its entire length to form a central bore into which pressure line 7 sealingly projects. Pressure line 7 is rigidly connected to extending cylinder 2. The outer seal (not given a reference numeral) providing the seal between extending piston 3 and extending cylinder 2, and the inner seal providing the seal between extending piston 3 and pressure line 7, are fastened to the top end of extending piston 3. The bottom end of extending cylinder 2 seals extending piston 3, so that closed extending piston annular space 8 is formed around piston 3.

First retraction pressure duct 13 extends in the wall of extending cylinder 2 from a connection point at the top end of extending cylinder 2 to an outlet that opens into the bottom end of extending piston annular space 8. Second retraction pressure duct 14 extends in the wall of extending piston 3 from an outlet at the top end of extending piston annular space 8 to an outlet opening into annular space 10 surrounding load-raising piston 5 at the bottom end of the annular space.

Extension line 20 is connected at the top of extending cylinder 2 and leads into cylinder space 11 of extending cylinder 2. Load-raising line 21 is also connected through the top of extending cylinder 2 to pressure line 7, which leads into cylinder space 9 of load-raising cylinder 4. Retraction line 22 is connected to the top of first retraction pressure duct 13.

In order to protect the components, and also to provide additional guidance during extension and retraction movements, guide tube 25 is rigidly connected to load-raising piston 5. Guide jacket 26 surrounds guide tube 25 and cooperates with guide tube 25 to provide guidance and is rigidly connected to extension cylinder 2.

In order to secure the semitrailer support in its extended position, catch 27 is mounted at the bottom end of guide jacket 26. Through the action of the dead weight of its handle, catch 27 is urged to turn (clockwise in the drawing), and when the semitrailer support is in the extended position, the bottom end of catch 27 falls into one of a plurality of catch apertures 28 provided close to the top end of guide tube 25.

Pump subassembly 31 housed in casing 32 is fastened to one of the two semitrailer supports 1. This subassembly comprises extending pump 35, load-raising pump 36 and retracting pump 37. Each of these pumps comprises two manually-operable pump units. These pump units pump from a common liquid reservoir, as schematically indicated by suction line 40 leading to the reservoir shown schematically as a pan. A nonreturn valve (not given a reference numeral) is disposed upstream and downstream of each pump unit in order to insure a correct double action of these pumps. Retracting pump 37 delivers into retraction line 22, load-raising pump 36 into load-raising line 21, and extending pump 35 into extension line 20.

In practice, the pumps may be provided on their outwardly-projecting shafts with short socket clips or operating stubs, into which a lever rod provided with a handle can be inserted. This lever can then be transferred from one pump to another, and may also be used for other operations.

Controllable return valve 42 is connected to retraction line 22. Its control inlet is connected to extension line 20, thereby opening the valve when pressure is applied to line 20 and freeing the return flow from retraction line 22 to the liquid reservoir. The control pressure operates a small piston in the upward direction, which by means of a projecting pin lifts a valve ball off its seat.

Pushrod-controlled pressure relief valve 43 is also connected to extension line 20 (in the drawing through the cylinder space of controllable return valve 42) and, when pumping begins, is briefly pressed into the open position by a pushrod cooperating mechanically with the pump shaft of retracting pump 37, thereby allowing the escape of a pressure prevailing in extension pipe 20.

Load-lowering valve 46 is connected to load-raising line 21. When valve 46 is opened the load-raising line is connected with throttling to a return path to the liquid reservoir.

Controllable return valve 52 is connected to extension line 20. The control inlet of valve 52 is connected to retraction line 22. The valve is opened when the retraction line is pressurized, thereby freeing the return flow from extension line 20 to the liquid reservoir. Pushrod-controlled pressure relief valve 53 is connected through return valve 52 to retraction line 22, and is briefly opened mechanically on commencement of pumping with extending pump 35.

The ratios of the delivery rates of pumps 35 and 36 per pump lever stroke, in relation to the end faces of pistons 3 and 5, are selected so that the extension of extending piston 3 through operation of extending pump 35 has a substantially higher transmission ratio than the load raising by extension of load-raising piston 5 by operation of load-raising pump 36. The extending pump operating the extending piston therefore has a substantially greater delivery volume per operating movement than the load-raising pump operating the load-raising piston, and/or the operative end face of load-raising piston 5 to which pressure is applied is substantially larger than the operative (annular) end face of extending piston 3.

In operation, when a semitrailer is to be supported before being uncoupled from its tractor, starting from the retracted position shown in the drawing, extending piston 3 is first lowered by attaching the pump lever to the shaft of extending pump 5 and operating the pump. Pressurized liquid thus passes into extension line 20 and acts on extending piston 3, which, together with load-raising piston 5 which remains stationary relative to the extending piston, is extended until foot disk 6 has been lowered onto the ground.

During the extension of extending piston 3 the liquid contained in extending piston annular space 8 is displaced through first retraction pressure duct 13 into retraction line 22. Since the pressure generated in extension line 20 has opened controllable return valve 42, the liquid can flow off through the latter from retraction line 22 into the liquid reservoir.

If the pressure prevailing in retraction line 22 upon commencement of the extension operation referred to should be so high that the force exerted by the extension pressure on the piston of controllable return valve 42 is not sufficient to open the latter, pushrod-controlled pressure relief valve 53 will come into operation. As the first pumping movements of extending pump 35 are made, pressure relief valve 53 is briefly opened, so that the excess pressure in retraction line 22 is eliminated and it is ensured that return valve 42 can be opened by the extending pressure.

When foot disk 6 has reached the ground, the force required for further extension increases sharply, because from then on the semitrailer has to be lifted. This cannot be done by means of extending pump 35, because the transmission ratio of this pump is too high and is intended for rapid extension by a few pump strokes. The pump lever is now removed from extending pump 35 and placed on load-raising pump 36, with which pumping continues.

The pressure generated in load-raising line 21 acts on load-raising piston 5, which is extended from load-raising cylinder 4 and begins to lift the semitrailer. The liquid thereby displaced from load-raising piston annular chamber 10 passes through second retraction pressure duct 14, extending piston annular chamber 8 and first retraction pressure duct 13 into retraction line 22 and can flow off via controllable return valve 42, which remains in the open position because the pressure in extension line 20 rises considerably upon commencement of the load raising operation.

Load raising through operation of load-raising pump 36 is continued until the kingpin of the semitrailer is freed from the coupling plate on the tractor. In this extended position catch 27 reaches catch apertures 28 and drops into one of them, thus mechanically securing the support in the extended position.

When the semitrailer is to be coupled to a tractor, load-lowering valve 46 is slowly opened, so that the pressurized liquid contained in cylinder space 9 of load-raising cylinder 4 can flow back into load-raising line 21 and can flow off through load-lowering valve 46 into the liquid reservoir. At the same time catch 27 is lifted, so that load-raising piston 5 can be retracted until the semitrailer has been lowered onto the coupling plate of the tractor and its weight is carried by the tractor. During this movement of load-raising piston 5, liquid is drawn into load-raising piston annular space 10, which is increasing in size, through suction line 40, retracting pump 37 with its nonreturn valves on each side, retraction line 22, first retraction pressure duct 13, extending piston annular space 8 and second retraction pressure duct 14.

When the weight of the semitrailer has been transferred from the supports to the tractor, the retraction of load-raising piston 5 is stopped and the pressure in extension line 20 decreases substantially. To effect further retraction, the pump lever is transferred to retracting pump 37, which continues the pumping. The pressure generated in retraction line 22 acts via first retraction pressure duct 13 on extending piston annular chamber 8, and thus on extending piston 3, in the retraction direction, and in addition, via the second retraction pressure duct 14 on load-raising piston annular chamber 10 and thus on load-raising piston 5, also in the retraction direction. The liquid further displaced by piston 5 from cylinder space 9 flows back to the reservoir by way of load-lowering valve 46.

The liquid displaced from cylinder space 11 by the retraction of extending piston 3, flows back through extension line 20 to controllable return valve 52, which has been opened by the pressure in retraction line 22. If the pressure still existing in extension line 20 on commencement of the operation of retracting pump 37 is so high that its force on the ball of controllable return valve 52 prevents the opening of the latter, pushrod-operated pressure relief valve 43 will come into operation to establish communication between extension line 20 and the return path, thus allowing the prevailing pressure to escape on the first few pump strokes of retracting pump 37.

The further operation of retracting pump 37 brings about the complete retraction of load-raising piston 5 and extending piston 3, whereby load-lowering valve 46 can be closed and, if desired, a mechanical system securing the support in the retracted position can be put into operation.

The above-described construction of a semitrailer support ensure that the operations of extension, load raising and retraction are each carried out by separate units, both on the pump side and on the cylinder side, thus making it possible to select in each case the most favorable transmission ratios and optimum adaptation to stresses which occur in each particular case, and thus enabling a simple construction, reliable operation and a longer life expectancy.

What is claimed is:

1. A hydraulically-operated support device for semitrailers, comprising:
   at least one hydraulic cylinder semitrailer support comprising an extending piston and an extending cylinder defining a first annular space therebetween and a load-raising piston and a load-raising cylinder defining a second annular space therebetween, the load-raising cylinder formed at a bottom end of the extending cylinder; and
   a pump subassembly for generating and controlling the hydraulic operating pressure comprising three independently-operable pumps:
   an extending pump communicating with and acting on the extending piston,
   a load-raising pump communicating with and acting on the load-raising piston, and
   a retracting pump communicating with and acting on the first and second annular spaces; wherein the transmission ratio between the load-raising pump and the load-raising piston is substantially lower than the transmission ratio between the extending pump and the extending piston.

2. The support device according to claim 1, wherein the extending pump has a substantially greater delivery volume per operating movement than the load-raising pump.

3. The support device according to claim 2, wherein the load-raising piston comprises an end face to which pressure is applied for the extension of the piston, the end face having an effective area larger than an annular end face of the extending piston to which pressure is applied for the extension of the extending piston.

4. The support device according to claim 1, further comprising:
   a first retraction pressure duct leading into the first annular space, which extends in a wall of the extending cylinder in an axial direction; and
   a second retraction pressure duct leading into the second annular space, which extends in an axial direction in a wall of the extending piston and a wall of the load-raising cylinder.

5. The support device according to claim 1, wherein the extending piston is hollowed to form a bore, and a pressure line connected to a load-raising line projects sealingly into the bore passage.

6. The support device according to claim 1, further comprising mechanical locking means securing the semitrailer support in the extended position.

7. The support device according to claim 1, wherein the cylinders are surrounded by a guide tube slidably disposed in an outer guide jacket.

8. The support device according to claim 7, further comprising a catch pivoted on the guide jacket and cooperating with catch apertures formed at a top end of the guide tube.

9. The support device according to claim 1, wherein the pump subassembly is fastened to one of the semitrailer supports.

10. The support device according to claim 1, further comprising operating stubs disposed on the pumps, which can be operatively connected to a pump lever.

11. The support device according to claim 10, wherein the pump lever can be operatively connected to a load-lowering valve.

* * * * *